(12) United States Patent
Guo et al.

(10) Patent No.: US 10,720,165 B2
(45) Date of Patent: Jul. 21, 2020

(54) KEYWORD VOICE AUTHENTICATION

(71) Applicant: QUALCOMM Incorporated, San Diego, CA (US)

(72) Inventors: Yinyi Guo, San Diego, CA (US); Erik Visser, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 21 days.

(21) Appl. No.: 15/413,110

(22) Filed: Jan. 23, 2017

(65) Prior Publication Data
US 2018/0211671 A1 Jul. 26, 2018

(51) Int. Cl.
| | |
|---|---|
| *G10L 17/20* | (2013.01) |
| *G10L 17/24* | (2013.01) |
| *G10L 17/04* | (2013.01) |
| *G10L 25/21* | (2013.01) |
| *G10L 17/06* | (2013.01) |
| *G10L 25/24* | (2013.01) |
| *G10L 21/0272* | (2013.01) |
| *G10L 21/0208* | (2013.01) |

(52) U.S. Cl.
CPC ............... *G10L 17/20* (2013.01); *G10L 17/04* (2013.01); *G10L 17/06* (2013.01); *G10L 17/24* (2013.01); *G10L 25/21* (2013.01); *G10L 25/24* (2013.01); *G10L 21/0208* (2013.01); *G10L 21/0272* (2013.01)

(58) Field of Classification Search
CPC ............................ G10L 21/208; G10L 21/272
USPC ........................................................ 704/233
See application file for complete search history.

(56) References Cited

U.S. PATENT DOCUMENTS

| | | | | |
|---|---|---|---|---|
| 5,924,065 A | * | 7/1999 | Eberman | G10L 21/0208 704/222 |
| 5,970,446 A | * | 10/1999 | Goldberg | G10L 15/20 704/233 |
| 6,067,513 A | | 5/2000 | Ishimitsu | |
| 6,141,644 A | * | 10/2000 | Kuhn | G10L 17/02 704/238 |
| 6,188,982 B1 | | 2/2001 | Chiang | |
| 8,639,502 B1 | * | 1/2014 | Boucheron | G10L 21/02 381/94.1 |
| 8,700,394 B2 | * | 4/2014 | Seltzer | G10L 15/20 704/233 |
| 2002/0116187 A1 | * | 8/2002 | Erten | G10L 21/0272 704/233 |

(Continued)

FOREIGN PATENT DOCUMENTS

JP 5200080 B2 5/2013

*Primary Examiner* — Daniel C Washburn
*Assistant Examiner* — Timothy Nguyen
(74) *Attorney, Agent, or Firm* — Moore IP/QUALCOMM Incorporated

(57) ABSTRACT

A method of authenticating a user based on voice recognition of a keyword includes generating, at a processor, clean speech statistics. The clean speech statistics are generated from an audio recording of the keyword spoken by the user during an enrollment phase. The method further includes separating speech data and noise data from noisy input speech using the clean speech statistics during an authentication phase. The method also includes authenticating the user by comparing the speech data to the clean speech statistics or by comparing the noisy input speech to noisy speech statistics. The noisy speech statistics are based at least in part on the noise data.

30 Claims, 7 Drawing Sheets

(56) References Cited

U.S. PATENT DOCUMENTS

| | | | | |
|---|---|---|---|---|
| 2002/0173959 A1* | 11/2002 | Gong | ............... | G10L 15/142 |
| | | | | 704/256.3 |
| 2003/0033143 A1* | 2/2003 | Aronowitz | ............ | G10L 15/20 |
| | | | | 704/233 |
| 2003/0163739 A1* | 8/2003 | Armington | ........... | G06F 21/32 |
| | | | | 726/3 |
| 2003/0182114 A1* | 9/2003 | Dupont | ............... | G10L 15/16 |
| | | | | 704/233 |
| 2003/0216911 A1* | 11/2003 | Deng | ............... | G10L 21/0208 |
| | | | | 704/227 |
| 2004/0215454 A1* | 10/2004 | Kobayashi | ......... | G10L 15/142 |
| | | | | 704/231 |
| 2005/0171774 A1* | 8/2005 | Applebaum | ......... | G10L 17/06 |
| | | | | 704/250 |
| 2006/0020460 A1* | 1/2006 | Itou | ............... | G10L 17/24 |
| | | | | 704/246 |
| 2007/0288242 A1* | 12/2007 | Spengler | ............. | G10L 15/20 |
| | | | | 704/275 |
| 2009/0299742 A1* | 12/2009 | Toman | ............. | G10L 21/0208 |
| | | | | 704/233 |
| 2012/0130713 A1* | 5/2012 | Shin | ............... | G10L 25/78 |
| | | | | 704/233 |
| 2013/0332165 A1* | 12/2013 | Beckley | ............. | G10L 17/04 |
| | | | | 704/246 |
| 2015/0221322 A1* | 8/2015 | Iyengar | ............. | G10L 25/84 |
| | | | | 704/226 |
| 2015/0287406 A1* | 10/2015 | Kristjansson | ........ | G10L 15/20 |
| | | | | 704/233 |
| 2017/0169828 A1* | 6/2017 | Sachdev | ............. | G10L 17/04 |

\* cited by examiner

KEYWORD VOICE AUTHENTICATION

I. FIELD

The present disclosure is generally related to voice authentication.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A wireless telephone may include a processor that is operable to execute a voice authentication application using a voice authentication system. During an enrollment phase of the voice authentication application, a user of the wireless telephone may audibly provide a keyword to the voice authentication system. As a non-limiting example, if the keyword is "access", the user may say "access" into a microphone of the wireless telephone during the enrollment phase, and the voice authentication system may generate an enrollment speech model that includes properties of the user's voice and the keyword (e.g., "access"). After the enrollment phase, the user may audibly provide the keyword to the voice authentication system to access data within the wireless telephone. For example, during an authentication phase of the voice authentication application, the user may speak the keyword into the microphone and the voice authentication system may generate a verification speech model that includes properties of the user's voice and the keyword.

The voice authentication system may compare the verification speech model to the enrollment speech model to determine whether there is a match. However, because the enrollment speech model is typically generated in a low-noise environment, there may be intrinsic mismatches between the verification speech model and the enrollment speech model if the verification speech model is generated in a high-noise environment. The intrinsic mismatches (caused by noise) may result in voice authentication errors.

III. SUMMARY

According to one implementation of the present disclosure, a method of authenticating a user based on voice recognition of a keyword includes generating, at a processor, clean speech statistics. The clean speech statistics are generated from an audio recording of the keyword spoken by the user during an enrollment phase. The method further includes separating speech data and noise data from noisy input speech using the clean speech statistics during an authentication phase. The method also includes authenticating the user by comparing the speech data to the clean speech statistics or by comparing the noisy input speech to noisy speech statistics. The noisy speech statistics are based at least in part on the noise data.

According to another implementation of the present disclosure, an apparatus for authenticating a user based on voice recognition of keyword includes a clean speech statistics generation unit configured to generate clean speech statistics. The clean speech statistics are generated from an audio recording of the keyword spoken by the user during an enrollment phase. The apparatus further includes a separation unit configured to separate speech data and noise data from noisy input speech using the clean speech statistics during an authentication phase. The apparatus also includes a user authentication unit configured to authenticate the user by comparing the speech data to the clean speech statistics or by comparing the noisy input speech to noisy speech statistics. The noisy speech statistics are based at least in part on the noise data.

According to another implementation of the present disclosure, a non-transitory computer-readable medium includes instructions for authenticating a user based on voice recognition of a keyword. The instructions, when executed by a processor, cause the processor to perform operations including generating clean speech statistics. The clean speech statistics are generated from an audio recording of the keyword spoken by the user during an enrollment phase. The operations further include separating speech data and noise data from noisy input speech using the clean speech statistics during an authentication phase. The operations also include authenticating the user by comparing the speech data to the clean speech statistics or by comparing the noisy input speech to noisy speech statistics. The noisy speech statistics are based at least in part on the noise data.

According to another implementation of the present disclosure, an apparatus for authenticating a user based on voice recognition of a keyword includes means for generating clean speech statistics. The clean speech statistics are generated from an audio recording of the keyword spoken by the user during an enrollment phase. The apparatus further includes means for separating speech data and noise data from noisy input speech using the clean speech statistics during an authentication phase. The apparatus also includes means for authenticating the user by comparing the speech data to the clean speech statistics or by comparing the noisy input speech to noisy speech statistics. The noisy speech statistics are based at least in part on the noise data.

IV. BRIEF DESCRIPTION OF THE DRAWINGS

V. DETAILED DESCRIPTION

Figure 1:
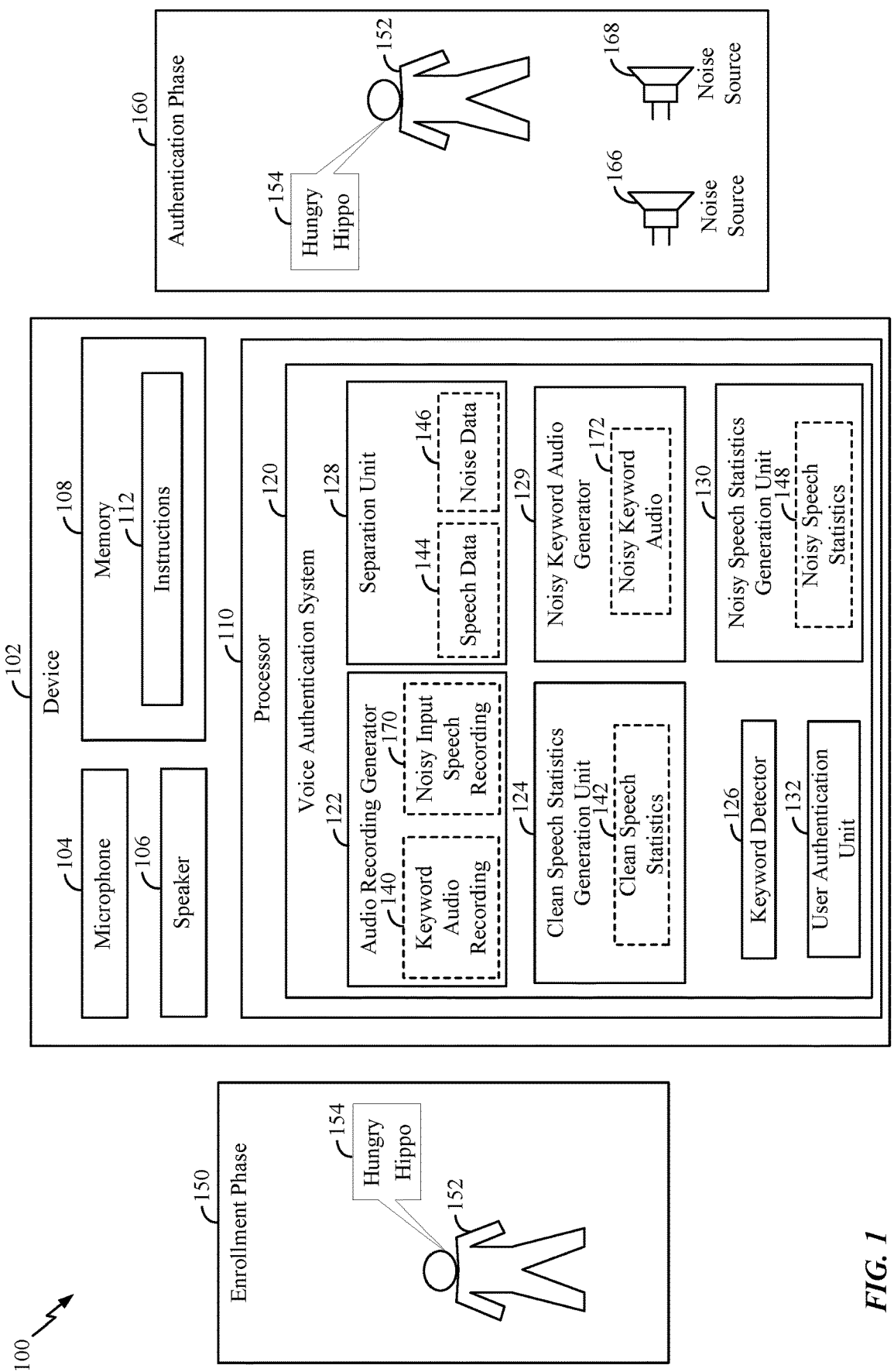
FIG. 1 is a diagram that illustrates a system that is operable to authenticate a user based on voice recognition of a keyword.

Referring to FIG. 1, a system 100 that is operable to authenticate a user based on voice recognition of a keyword is shown. The system 100 includes a device 102. The device 102 includes a microphone 104, a speaker 106, a memory 108, and a processor 110. The memory 108 may be a non-transitory computer-readable medium including instructions 112 that, when executed by the processor 110, cause the processor 110 to perform operations described herein.

The microphone 104 may be configured to capture one or more audio signals from sound sources surrounding the device 102. The speaker 106 may be configured to output one or more sounds from the device 102 to a surrounding environment. According to one implementation, the speaker 106 may include one or more headphones. According to another implementation, the speaker 106 may include one or more loudspeakers.

The processor 110 includes a voice authentication system 120. The voice authentication system 120 includes an audio recording generator 122, a clean speech statistics generation unit 124, a keyword detector 126, a separation unit 128, a noisy keyword audio generator 129, a noisy speech statistics generation unit 130, and a user authentication unit 132. According to some implementations, one or more components of the voice authentication system 120 may be combined into a single component. One or more of the components of the voice authentication system 120 may be implemented as hardware (e.g., circuitry). In additional, or in the alternative, one or more of the components of the voice authentication system 120 may be implemented as software (e.g., instructions) executable by the processor 110. As described below, the voice authentication system 120 may be operable to authenticate a user 152 based on voice recognition of a keyword 154.

During an enrollment phase 150 of a voice authentication process, the voice authentication system 120 may "enroll" or register voice characteristics of the keyword 154 spoken by the user 152. The voice characteristics may be subsequently used as an authentication technique to verify that the user 152 (as opposed to another person) is attempting to access information or applications associated with the device 102. During the enrollment phase 150, the user 152 may provide the keyword 154 to the device 102, and the voice authentication system 120 may generate voice characteristics (e.g., voice statistics) of the user 152 speaking the keyword 154. To illustrate, the user 152 may speak the keyword 154 into the microphone 104 during the enrollment phase 150. According to some implementations, the keyword 154 may be a phrase (e.g., multiple words). As a non-limiting example, in FIG. 1, the keyword 154 is "Hungry Hippo". However, it should be understood that this is merely a non-limiting example of the keyword 154 and should not be construed as limiting. According to one implementation, the user 152 may interact with a user interface (not shown) of the device 102 to "enroll" the keyword 154 with the voice authentication system 120. For example, the user 152 may select a user interface option that prompts the user 152 to provide the keyword 154 as an authentication option to gain access to the device 102. According to one implementation, the user 152 may be located in a relatively noise-free environment (e.g., a "clean" environment) during the enrollment phase 150. Thus, the keyword 154 may be provided to the device 102 as a "clean speech input" during the enrollment phase 150.

After the microphone 104 captures the keyword 154 during the enrollment phase 150, the audio recording generator 122 generates a keyword audio recording 140 of the keyword 154 (as spoken by the user 152 during the enrollment phase 150). The audio recording generator 122 may initiate recording operations in response to the user 152 selecting the user interface option that enables the user 152 to provide the keyword 154 as the authentication option. The keyword audio recording 140 may be provided to the clean speech statistics generation unit 124.

The clean speech statistics generation unit 124 may be configured to generate (or extract) clean speech statistics 142 from the keyword audio recording 140. For example, the clean speech statistics generation unit 124 may generate cepstral parameters (e.g., Mel-Frequency cepstral coefficients (MFCCs)) of the keyword audio recording 140. The cepstral parameters may be generated by performing a Fourier Transform operation on the keyword audio recording 140 to generate a spectrum, mapping powers of the spectrum onto a Mel scale using overlapping windows, obtaining logarithms of each power at each Mel frequency, and performing a Discrete Cosine Transform (DCT) operation of the Mel logarithm powers. The clean speech statistics 142 (e.g., the cepstral parameters or the MFCCs) may be amplitudes of the spectrum generated from the DCT operation. Thus, the clean speech statistics 142 may be a representation of a power spectrum of the keyword 154 as spoken by the user 152 during the enrollment phase 150. According to one implementation, multiple samples of the keyword 154 (from the user 152) may be generated by the voice authentication system 120. The keyword audio recording 140 and the clean speech statistics 142 may be generated based on the multiple samples. The clean speech statistics 142 may be provided to the user authentication unit 132 to authenticate the user 152 during an authentication phase 160 of the voice authentication process, as described below.

During the authentication phase 160, the voice authentication system 120 authenticates the user 152 to access information and applications associated with the device 102 upon detecting that keyword 154 has been uttered by the user 152 (as opposed to another person). Thus, during the authentication phase 160, the voice authentication system 120 verifies that the keyword 154 detected by the microphone 104 has the same voice characteristics as the keyword 154 registered by the user 152 during the enrollment phase 150.

According to one implementation of the authentication phase 160, the voice authentication system 120 may monitor for the keyword 154 to be spoken. For example, the keyword detector 126 may monitor speech (captured by the microphone 104) for the keyword 154. According to one implementation, the keyword detector 126 may continuously monitor speech for the keyword 154. According to another implementation, the keyword detector 126 may periodically monitor speech for the keyword 154. As a non-limiting example, the keyword detector 126 may monitor speech every five seconds. According to yet another implementation, the keyword detector 126 may monitor speech in response to a user-initiated prompt. For example, the user 152 may select a user interface option that enables the keyword detector 126 to monitor speech (captured by the microphone 104) for the keyword 154.

In response to the keyword detector 126 detecting the keyword 154, the audio recording generator 122 may generate an audio recording beginning from a particular amount of time before the keyword 154 is detected and ending at a particular amount of time after the keyword 154 is detected. As a non-limiting example, the audio recording generator 122 may generate an audio recording that begins two seconds prior to detection of the keyword 154 and that ends two seconds after detection of the keyword 154 to ensure that the audio recording includes the keyword 154. However, the keyword detector 126 may detect the keyword 154 (from the user 152) along with other noise during the authentication phase 160. For example, the user 152 may be near different noise sources 166, 168 while speaking the keyword 154 into the microphone 104. As a result, the noise sources 166, 168 may cause the keyword detector 126 to detect noise in addition to the keyword 154. In the example of FIG. 1, in addition to detecting the keyword 154, the keyword detector 126 may detect a first noise from the noise source 166 and a second noise from the noise source 168. Thus, the audio recording of the keyword 154 generated during the authentication phase 160 may include noise (e.g., the audio recording generator 122 may generate a noisy input speech recording 170). The noisy input speech recording 170 may be provided to the separation unit 128.

The separation unit 128 may be configured to separate speech data 144 and noise data 146 from the noisy input speech recording 170 using the clean speech statistics 142. For example, the clean speech statistics generation unit 124 may provide the clean speech statistics 142 to the separation unit 128. The separation unit 128 may use the cepstral parameters (e.g., the MFCCs) to filter noise (e.g., the noise data 146) from the noisy input speech recording 170. For example, the clean speech statistics 142 may be a representation of a power spectrum of the keyword 154 as spoken by the user 152 during the enrollment phase 150. The separation unit 128 may isolate component of the noisy input speech recording 170 having a similar spectrum to generate the speech data 144. As a result, the resulting signal after the noise is filtered from the noisy input speech recording 170 is the speech data 144. If the same user 152 uttered the keyword 154 during the authentication phase 160 and during the enrollment phase 150, the speech data 144 may have substantially similar characteristics as the clean speech statistics 142 of the keyword audio recording 140. The speech data 144 may be provided to the user authentication unit 132.

According to a first implementation of the authentication phase 160, the user authentication unit 132 may be configured to authenticate the user 152 by comparing the speech data 144 to the clean speech statistics 142. For example, if the clean speech statistics 142 are similar (or substantially similar) to the speech data 144, the user authentication unit 132 may determine that the same user 152 provided the keyword 154 during the enrollment phase 150 and during the authentication phase 160. As a result, the user authentication unit 132 may grant the user 152 access to the device 102. Otherwise, the user authentication unit 132 may deny the user 152 access to the device 102, determine whether to grant access based on results of a second implementation of the authentication phase 160, or initiate authentication using an another authentication process (e.g., a user pin).

According to the second implementation of the authentication phase 160, the user authentication unit 132 may be configured to authenticate the user 152 by comparing the noisy input speech recording 170 to noisy speech statistics 148 based at least in part on the noise data 146. To illustrate, the keyword audio recording 140 and the noise data 146 may be provided to the noisy keyword audio generator 129. The noisy keyword audio generator 129 may generate noisy keyword audio 172 based on the noise data 146 and the keyword audio recording 140. For example, the noisy keyword audio generator 129 may add the noise data 146 to the keyword audio recording 140 to generate the noisy keyword audio 172. The noisy keyword audio 172 may be provided to the noisy speech statistics generation unit 130.

The noisy speech statistics generation unit 148 may be configured to generate (or extract) the noisy speech statistics 148 from the noisy keyword audio 172. For example, the noisy speech statistics generation unit 130 may generate cepstral parameters (e.g., MFCCs) of the noisy keyword audio 172. The cepstral parameters may be generated by performing a Fourier Transform operation on the noisy keyword audio 172 to generate a spectrum, mapping powers of the spectrum onto a Mel scale using overlapping windows, obtaining logarithms of each power at each Mel frequency, and performing a DCT operation of the Mel logarithm powers. The noisy speech statistics 148 (e.g., the cepstral parameters or the MFCCs) may be amplitudes of the spectrum generated from the DCT operation. The noisy speech statistics 148 may be provided to the user authentication unit 132 along with the noisy input speech recording 170 to authenticate the user 152 according to the second implementation of the authentication phase 160.

According to the second implementation of the authentication phase 160, the user authentication unit 132 may be configured to authenticate the user 152 by comparing the noisy input speech recording 170 to the noisy speech statistics 148. For example, if the noisy speech statistics 148 are similar (or substantially similar) to the noisy input speech recording 170, the user authentication unit 132 may determine that the same user 152 provided the keyword 154 during the enrollment phase and during the authentication phase 160. As a result, the user authentication unit 132 may grant the user 152 access to the device 102. Otherwise, the user authentication unit 132 may deny the user 152 access to the device 102, determine whether to grant access based on results of the first implementation of the authentication phase 160 described above, or initiate authentication using an another authentication process (e.g., a user pin).

In some scenarios, the first implementation of the authentication phase 160 may operate in parallel with the second implementation of the authentication phase 160. For example, the user authentication unit 132 may compare the speech data 144 with the clean speech statistics 142 to generate a first score for the first implementation. Additionally, sequentially or in parallel, the user authentication unit 132 may compare the noisy input speech recording 170 with the noisy speech statistics 148 to generate a second score for the second implementation. The voice authentication system 120 may determine the reliability of the voice authentication processes described above by comparing the first score to the second score. For example, if the first score is substantially similar to the second score, the voice authentication system 120 may determine that the voice authentication processes are reliable. However, if the first score is substantially different from the second score, the voice authentication system 120 may determine that the voice authentication processes are unreliable. If the voice authentication processes are determined to be unreliable, the voice authentication system 120 may generate a message indicating that the user 152 should choose a different form of authentication (e.g., a password, facial recognition, a fingerprint, etc.), take the device 102 to manufacturing for troubleshooting, update the voice authentication system 120, etc.

According to another implementation of the authentication phase 160, the voice authentication system 120 may bypass keyword detection and provide audio (detected at the microphone 104) to the separation unit 128 as the noisy input speech. Thus, according one implementation, noisy input speech (as opposed to the noisy input speech recording 170) may be provided to the separation unit 128 in "real-time". The voice authentication system 120 may continuously perform the authentication operations described above on the noisy input speech (as opposed to the noisy input speech recording 170) to authenticate the user 152 during the authentication phase 160. If the keyword 154 is included in the noisy input speech, the user authentication unit 132 may authenticate the user 152. If the keyword 154 is not included in the noisy input speech, the user authentication unit 132 may deny the user 152 access to the device 102.

The techniques described with respect to FIG. 1 may reduce the amount of voice authentication errors caused by intrinsic mismatches due to noise that is present during the authentication phase 160. For example, the clean speech statistics 142 generated from the keyword audio recording 140 may be used to separate speech data 144 and noise data 146 from the noisy input speech recording 170. The speech data 144 represents the keyword 154 spoken during the authentication phase 160 without (or substantially without) the noise from the noise sources 166, 168. Thus, the intrinsic mismatches due to the noise from the noise sources 166, 168 may be reduced by separating the speech data 144 from the noisy input speech recording 170 based on the clean speech statistics 142. As another example, the noisy speech statistics 148 generated from the noise data 146 and the keyword audio recording 140 may be used to reduce the intrinsic mismatches due to noise that is present during the authentication phase 160. For example, combining the noise data 146 with the keyword audio recording 140 may create the noisy keyword audio 172 that is substantially similar to the noisy input speech recording 170 if the same user 152 uttered the keyword 154 during the enrollment phase 150 and during the authentication phase 160.

Figure 2:
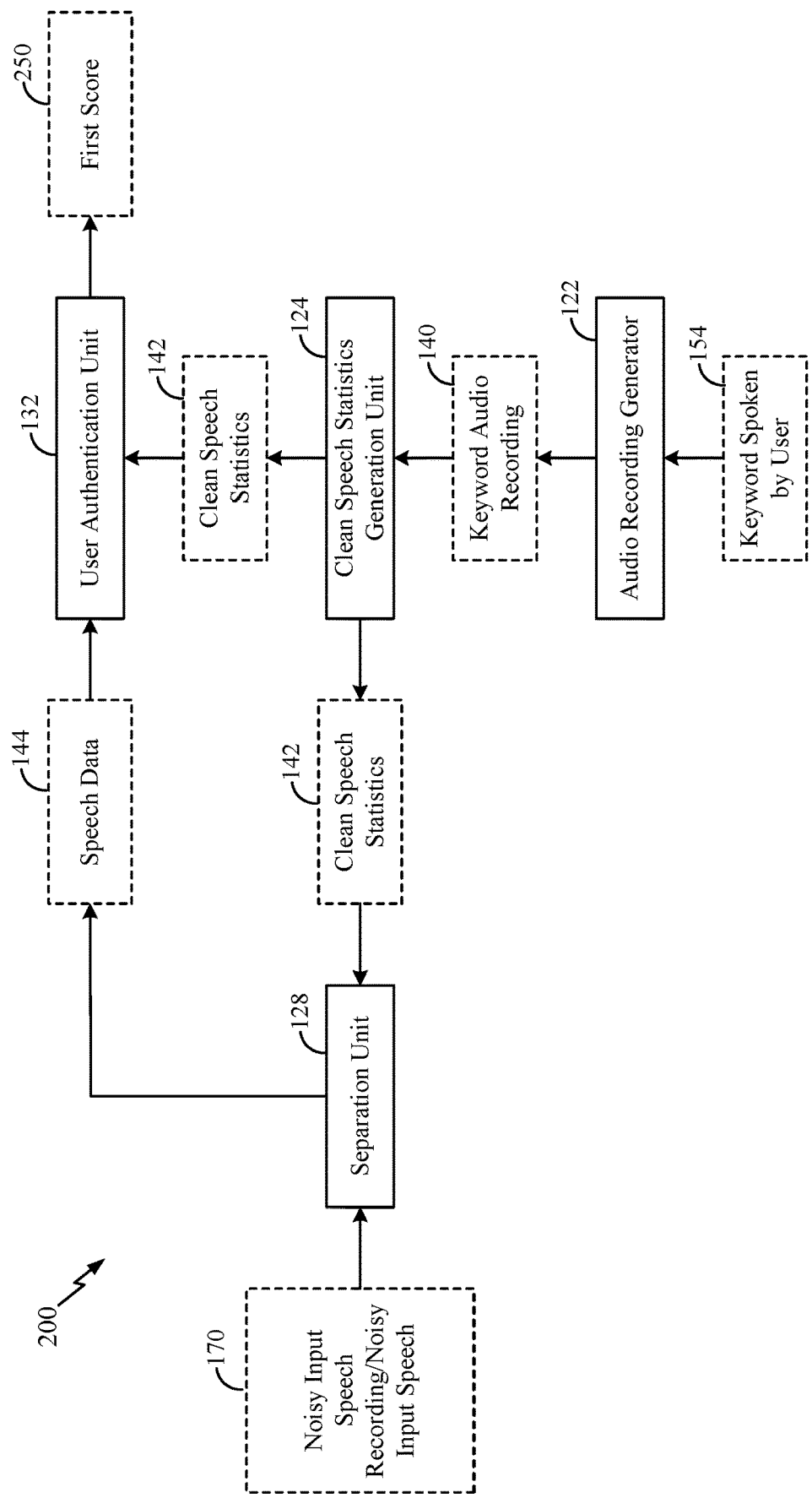
FIG. 2 is a process diagram of authenticating a user based on voice recognition of a keyword.

Referring to FIG. 2, a process diagram 200 of the first implementation of the authentication phase 160 is shown. Operations associated with the process diagram 200 may be performed by the device 102 of FIG. 1. In particular, operations associated with the process diagram 200 may be performed by the voice authentication system 120 of the processor 110.

According to the process diagram 200, the keyword 154 spoken by the user 152 is provided to the audio recording generator 122 during the enrollment phase 150. The audio recording generator 122 may generate the keyword audio recording 140 of the keyword 154. The audio recording generator 122 may initiate recording operations if the user 152 selects the user interface option enabling the user 152 to provide the keyword 154 as the authentication option. The keyword audio recording 140 is provided to the clean speech statistics generation unit 124.

The clean speech statistics generation unit 124 may generate (or extract) the clean speech statistics 142 from the keyword audio recording 140. For example, the clean speech statistics generation unit 124 may generate cepstral parameters (e.g., Mel-Frequency cepstral coefficients (MFCCs)) of the keyword audio recording 140. The clean speech statistics 142 are provided to the user authentication unit 132 and (as feedback) to the separation unit 128.

The noisy input speech recording 170 (or the noisy input speech if keyword detection during the authentication phase 160 is bypassed) is provided to the separation unit 128. The separation unit 128 separates speech data 144 from the noisy input speech recording 170 using the clean speech statistics 142. For example, the separation unit 128 may use the cepstral parameters (e.g., the MFCCs) to filter noise from the noisy input speech recording 170. The resulting signal after the noise is filtered from the noisy input speech recording 170 is the speech data 144. The speech data 144 is provided to the user authentication unit 132.

The user authentication unit 132 may authenticate the user 152 by comparing the speech data 144 to the clean speech statistics 142. For example, if the clean speech statistics 142 are similar (or substantially similar) to the speech data 144, the user authentication unit 132 may determine that the same user 152 provided the keyword 154 during the enrollment phase 150 and during the authentication phase 160. As a result, the user authentication unit 132 may grant the user 152 access to the device 102. According to one implementation, the user authentication unit 132 may generate a first score 250 (e.g., a comparison value indicating a similarity between the speech data 144 and the clean speech statistics 142). If the first score 250 satisfies a similarity threshold, the user authentication unit 132 may grant the user 152 access to the device 102. Otherwise, the user authentication unit 132 may deny the user 152 access to the device 102, determine whether to grant access based on results of the second implementation of the authentication phase 160, as illustrated in FIG. 3, or initiate authentication using an another authentication process (e.g., a user pin).

The process diagram 200 of FIG. 2 may reduce the amount of voice authentication errors caused by intrinsic mismatches due to noise that is present during the authentication phase 160. For example, the clean speech statistics 142 may be used to separate speech data 144 from the noisy input speech recording 170. The speech data 144 represents the keyword 154 spoken during the authentication phase 160 without (or substantially without) the noise from the noise sources 166, 168. Thus, the intrinsic mismatches due to the noise from the noise sources 166, 168 may be reduced by separating the speech data 144 from the noisy input speech recording 170 based on the clean speech statistics 142.

Figure 3:
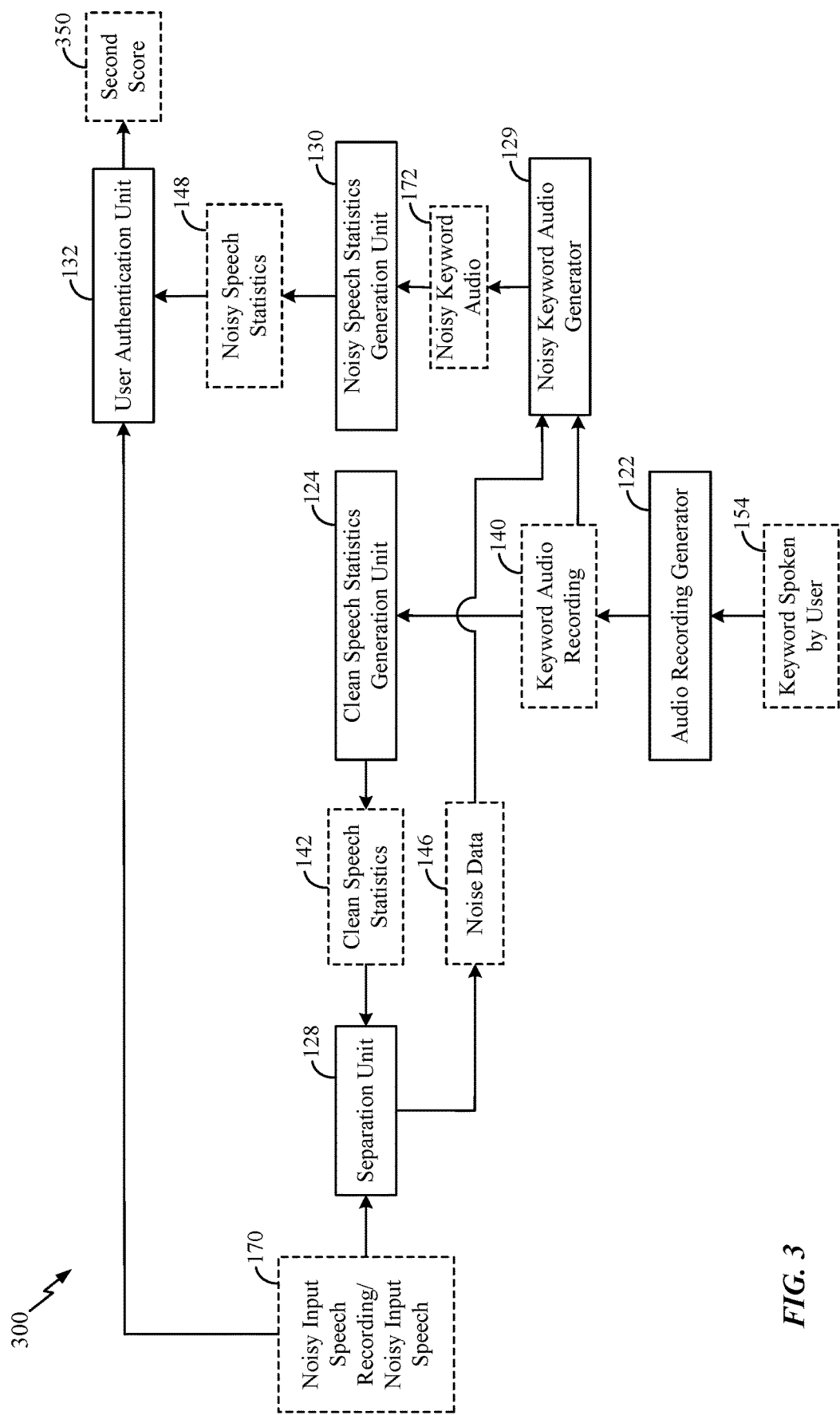
FIG. 3 is another process diagram of authenticating a user based on voice recognition of a keyword.

Referring to FIG. 3, a process diagram 300 of the second implementation of the authentication phase 160 is shown. Operations associated with the process diagram 300 may be performed by the device 102 of FIG. 1. In particular, operations associated with the process diagram 300 may be performed by the voice authentication system 120 of the processor 110.

According to the process diagram 300, the keyword 154 spoken by the user 152 is provided to the audio recording generator 122 during the enrollment phase 150. The audio recording generator 122 may generate the keyword audio recording 140 of the keyword 154. The audio recording generator 122 may initiate recording operations if the user 152 selects the user interface option enabling the user 152 to provide the keyword 154 as the authentication option. The keyword audio recording 140 is provided to the clean speech statistics generation unit 124 and to the noisy keyword audio generator 129.

The clean speech statistics generation unit 124 may generate (or extract) the clean speech statistics 142 from the keyword audio recording 140. For example, the clean speech statistics generation unit 124 may generate cepstral parameters (e.g., Mel-Frequency cepstral coefficients (MFCCs)) of the keyword audio recording 140. The clean speech statistics 142 are provided as feedback to the separation unit 128.

The noisy input speech recording 170 (or the noisy input speech if keyword detection during the authentication phase 160 is bypassed) is provided to the separation unit 128. The separation unit 128 may separate noise data 146 from the noisy input speech recording 170 using the clean speech statistics 142. For example, the separation unit 128 may use the cepstral parameters (e.g., the MFCCs) to filter noise (e.g., the noise data 146) from the noisy input speech recording 170. The noise data 146 is provided to the noisy keyword audio generator 129.

The noisy keyword audio generator 129 may generate the noisy keyword audio 172 based on the noise data 146 and the keyword audio recording 140. For example, the noisy keyword audio generator 129 may add the noise data 146 to the keyword audio recording 140 to generate the noisy keyword audio 172. The noisy keyword audio 172 is provided to the noisy speech statistics generation unit 130.

The noisy speech statistics generation unit 148 may generate (or extract) the noisy speech statistics 148 from the noisy keyword audio 172. For example, the noisy speech statistics generation unit 130 may generate cepstral parameters (e.g., MFCCs) of the noisy keyword audio 172. The noisy speech statistics 148 is provided to the user authentication unit 132 along with the noisy input speech recording 170. The user authentication unit 132 may authenticate the user 152 by comparing the noisy input speech recording 170 to the noisy speech statistics 148. For example, if the noisy speech statistics 148 are similar (or substantially similar) to the noisy input speech recording 170, the user authentication unit 132 may determine that the same user 152 provided the keyword 154 during the enrollment phase and during the authentication phase 160. As a result, the user authentication unit 132 may grant the user 152 access to the device 102. According to one implementation, the user authentication unit 132 may generate a second score 350 (e.g., a comparison value indicating a similarity between the noisy input speech recording 170 and the noisy speech statistics 148). If the second score 350 is greater than the similarity threshold, the user authentication unit 132 may grant the user 152 access to the device 102. Otherwise, the user authentication unit 132 may deny the user 152 access to the device 102, determine whether to grant access based on results of the first implementation of the authentication phase 160 described above, or initiate authentication using an another authentication process (e.g., a user pin).

The process diagram 300 of FIG. 3 may reduce the amount of voice authentication errors caused by intrinsic mismatches due to noise that is present during the authentication phase 160. For example, the noisy speech statistics 148 generated from the noise data 146 and the keyword audio recording 140 may be used to reduce the intrinsic mismatches due to noise that is present during the authentication phase 160. Combining the noise data 146 with the keyword audio recording 140 may create the noisy keyword audio 172 that is substantially similar to the noisy input speech recording 170 if the same user 152 uttered the keyword 154 during the enrollment phase 150 and during the authentication phase 160.

Figure 4:
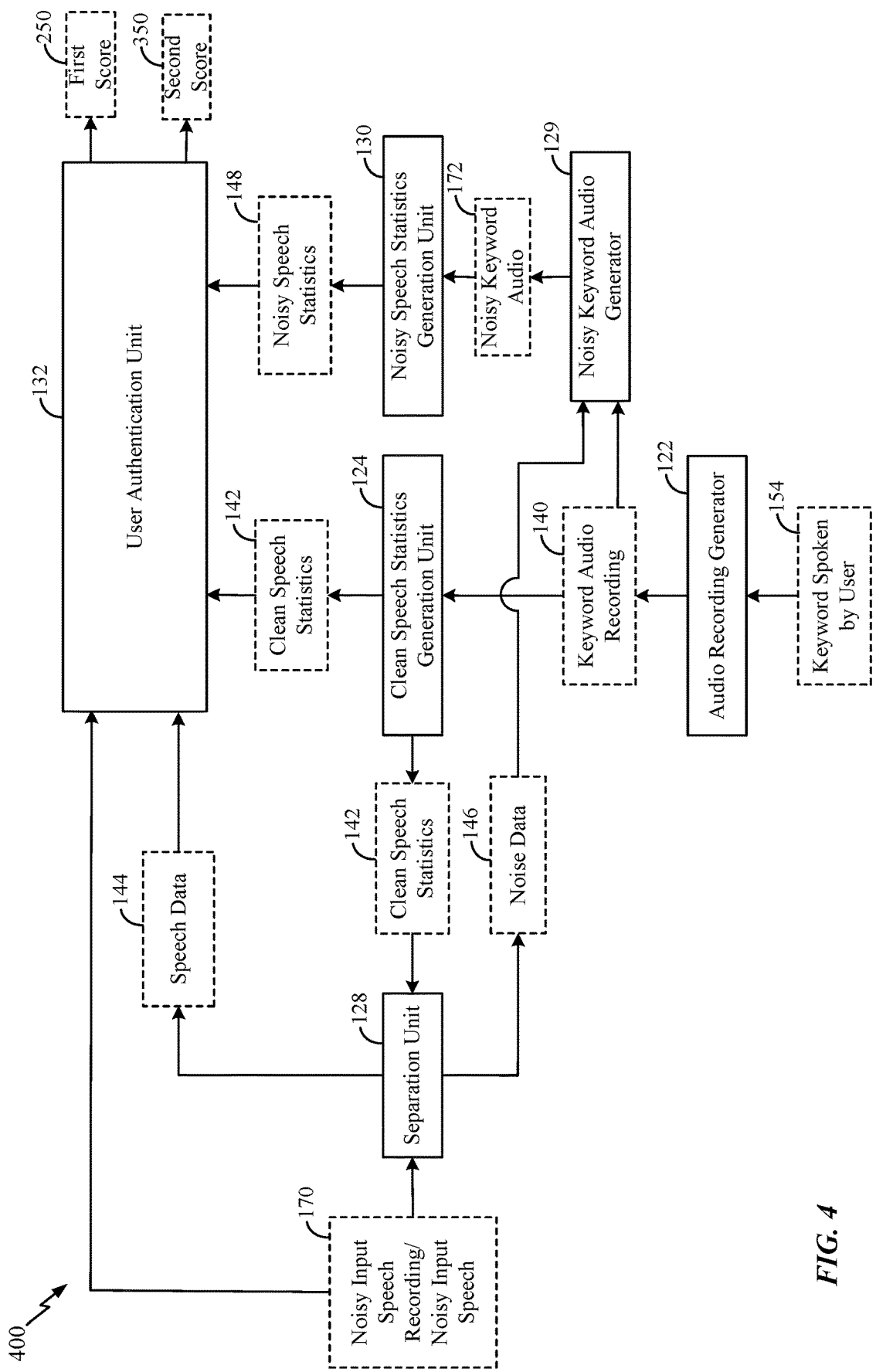
FIG. 4 is a process diagram illustrating dual-techniques for authenticating a user based on voice recognition of a keyword.

Referring to FIG. 4, a process diagram 400 illustrating dual-techniques for authenticating a user based on voice recognition of a keyword is shown. Operations associated with the process diagram 400 may be performed by the device 102 of FIG. 1. In particular, operations associated with the process diagram 400 may be performed by the voice authentication system 120 of the processor 110.

The process diagram 400 may implement the operations of the process diagram 200 of FIG. 2 and the operations of the process diagram 300 of FIG. 3. For example, the user authentication unit 132 may compare the speech data 144 with the clean speech statistics 142 to generate the first score 250 for the first implementation of the authentication phase 160. Additionally, the user authentication unit 132 may compare the noisy input speech recording 170 with the noisy speech statistics 148 to generate the second score 350 for the second implementation of the authentication phase 160. The reliability of the two implementation may be determined by comparing the first score 250 to the second score 350. For example, if the first score 250 is substantially similar to the second score 350, the voice authentication techniques described with respect to FIGS. 1-4 may be determined to be reliable. However, if the first score 250 is substantially different from the second score 350, the voice authentication techniques may be determined to be unreliable. If the voice authentication techniques are determined to be unreliable, a message may be generated that indicates the user 152 should choose a different form of authentication (e.g., a password, facial recognition, a fingerprint, etc.), take the device 102 to manufacturing for troubleshooting, update the voice authentication system 120, etc.

Figure 5:
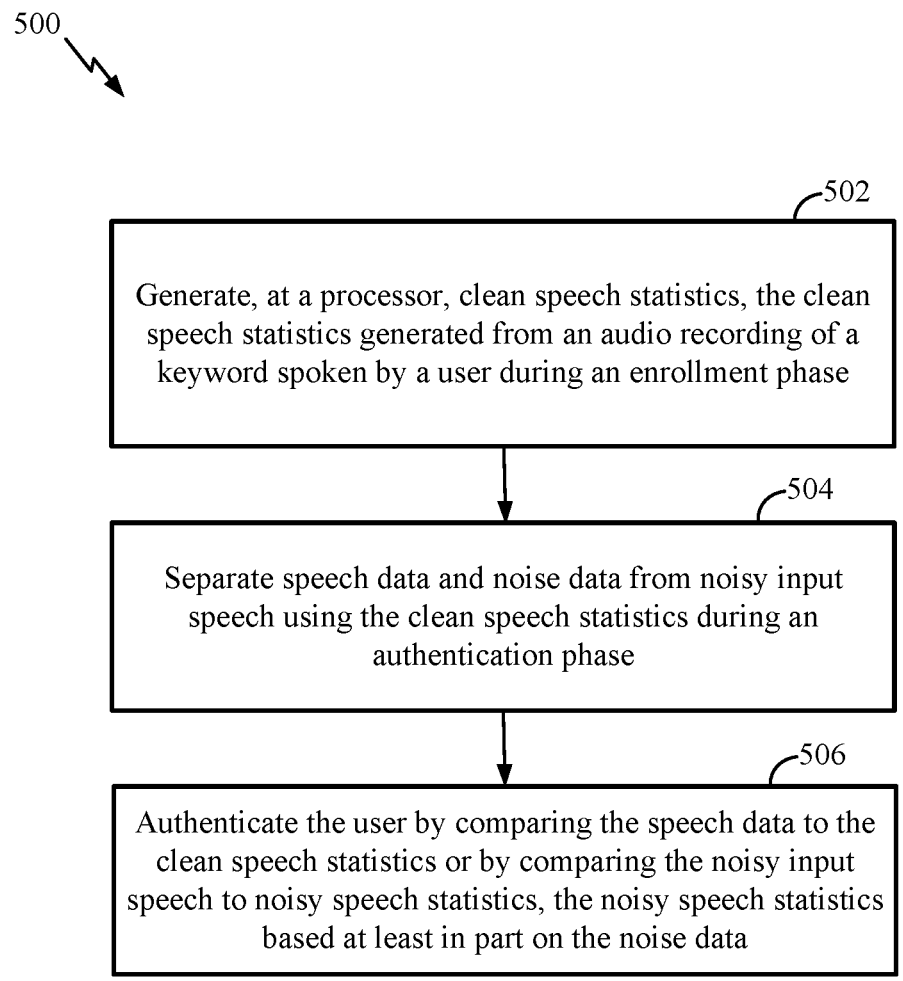
FIG. 5 is a method of authenticating a user based on voice recognition of a keyword.

Referring to FIG. 5, a method 500 of authenticating a user based on voice recognition of a keyword is shown. The method 500 may be performed by the device 102 of FIG. 1. In particular, method 500 may be performed by the voice authentication system 120 of the processor 110.

The method 500 includes generating, at a processor, clean speech statistics, at 502. The clean speech statistics may be generated from an audio recording of a keyword spoken by a user during an enrollment phase. For example, referring to FIG. 1, the clean speech statistics generation unit 142 may generate the clean speech statistics 142 from the keyword audio recording 140 during the enrollment phase 150. The keyword audio recording 140 may be an audio recording of the keyword 154 spoken by the user 152 during the enrollment phase 150.

The method 500 includes separating speech data and noise data from noisy input speech using the clean speech statistics during an authentication phase, at 504. For example, referring to FIG. 1, the separation unit 128 may separate the speech data 144 and the noise data 146 from the noisy input speech recording 170 using the clean speech statistics 142 generated at the clean speech statistics generation unit 124.

The method 500 includes authenticating the user by comparing the speech data to the clean speech statistics or by comparing the noisy input speech to noisy speech statistics, at 506. The noisy speech statistics may be based at least in part on the noise data. For example, referring to FIG. 1, the user authentication unit 132 may authenticate the user 152 by comparing the speech data 144 to the clean speech statistics 142. If the clean speech statistics 142 are similar (or substantially similar) to the speech data 144, the user authentication unit 132 may determine that the same user 152 provided the keyword 154 during the enrollment phase 150 and during the authentication phase 160. As a result, the user authentication unit 132 may grant the user 152 access to the device 102.

As another example, the noisy keyword audio generator 129 may generate the noisy keyword audio 172 based on the noise data 146 and the keyword audio recording 140. The noisy speech statistics generation unit 130 may generate the noisy speech statistics 148 from the noisy keyword audio 172, and the user authentication unit 132 may authenticate the user 152 by comparing the noisy input speech recording 170 to the noisy speech statistics 148. For example, if the noisy speech statistics 148 are similar (or substantially similar) to the noisy input speech recording 170, the user authentication unit 132 may determine that the same user 152 provided the keyword 154 during the enrollment phase and during the authentication phase 160. As a result, the user authentication unit 132 may grant the user 152 access to the device 102.

According to one implementation, the method 500 may include detecting the keyword from noisy input speech during the authentication phase. For example, referring to FIG. 1, the keyword detector 126 may detect the keyword 154 from the user 152 during the authentication phase 160. The user 152 may be surrounded by other noise sources 166, 168 during the authentication phase 160, which may result in the keyword 154 being included in noisy input speech. As described with respect to FIG. 1, the noisy input speech may be recorded (by the audio recording generator 122) as the noisy input speech recording 170.

According to one implementation, the method 500 may include determining a first score that indicates a similarity between the speech data and the clean speech statistics. The method 500 may also include comparing the first score to a similarity threshold. The user may be authenticated if the first score satisfies the similarity threshold. The user may not be authenticated if the first score fails to satisfy the similarity threshold. According to one implementation, the method 500 may include determining a second score that indicates a similarity between the noisy input speech and the noisy speech statistics. The method 500 may also include comparing the second score to the similarity threshold. The user may be authenticated if the second score satisfies the similarity threshold. The user may not be authenticated if the second score fails to satisfy the similarity threshold. The method 500 may also include determining whether a result of authenticating the user is reliable based on a comparison of the first score and the second score.

The method 500 of FIG. 5 may reduce the amount of voice authentication errors caused by intrinsic mismatches due to noise that is present during the authentication phase 160. For example, the clean speech statistics 142 generated from the keyword audio recording 140 may be used to separate speech data 144 and noise data 146 from the noisy input speech recording 170. The speech data 144 represents the keyword 154 spoken during the authentication phase 160 without (or substantially without) the noise from the noise sources 166, 168. Thus, the intrinsic mismatches due to the noise from the noise sources 166, 168 may be reduced by separating the speech data 144 from the noisy input speech recording 170 based on the clean speech statistics 142. As another example, the noisy speech statistics 148 generated from the noise data 146 and the keyword audio recording 140 may be used to reduce the intrinsic mismatches due to noise that is present during the authentication phase 160. For example, combining the noise data 146 with the keyword audio recording 140 may create the noisy keyword audio 172 that is substantially similar to the noisy input speech recording 170 if the same user 152 uttered the keyword 154 during the enrollment phase 150 and during the authentication phase 160.

Figure 6:
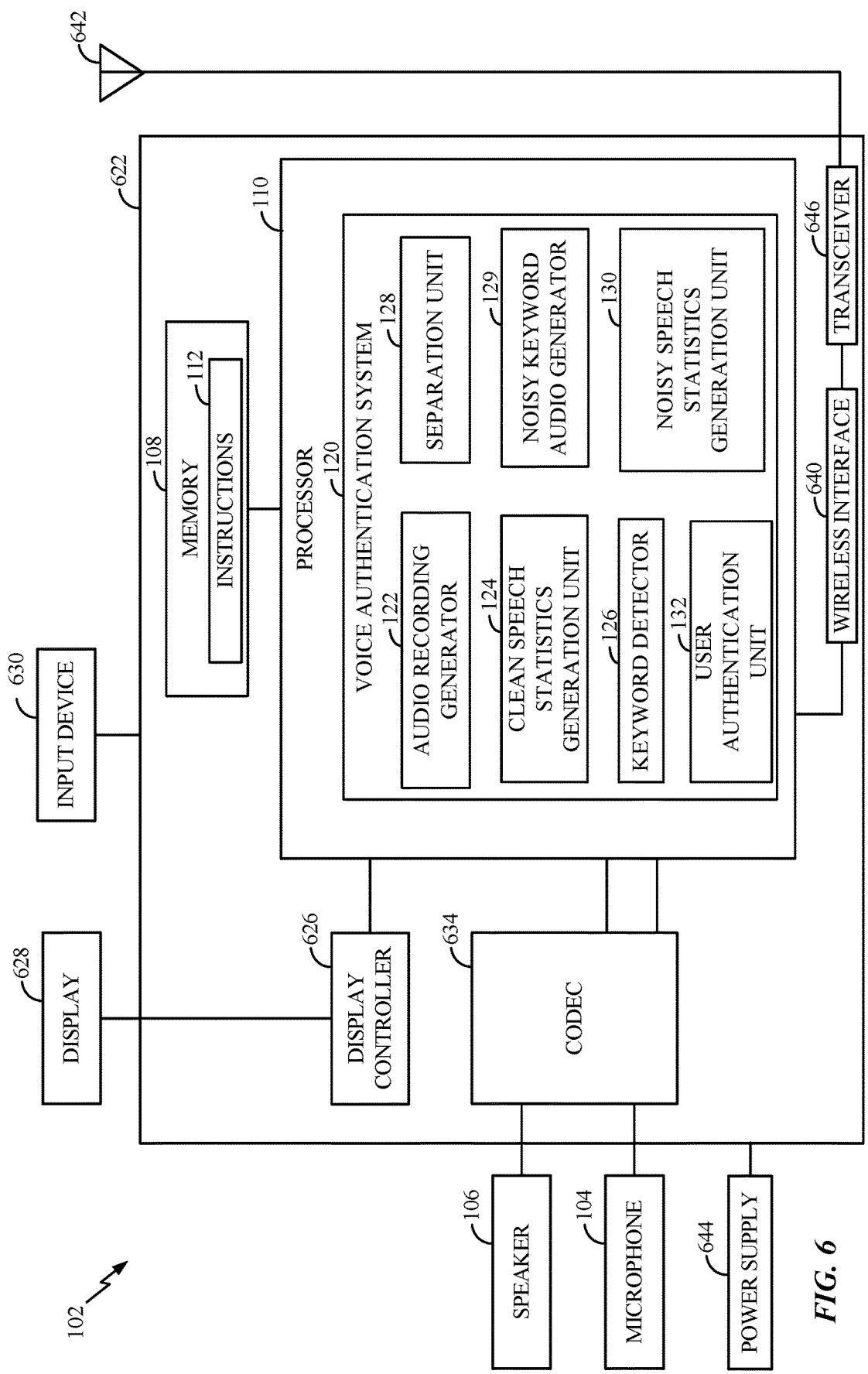
FIG. 6 is a diagram of a device that is operable to support various implementations of one or more methods, systems, apparatuses, and/or computer-readable media disclosed herein.

Referring to FIG. 6, the device 102 is depicted. The device 102 may be a mobile device that includes the processor 110 (e.g., a digital signal processor or central processing unit) coupled to the memory 108.

The processor 110 may include the voice authentication system 120 of FIG. 1. The voice authentication system 120 includes the audio recording generator 122, the clean speech statistics generation unit 124, the keyword detector 126, the separation unit 128, the noisy keyword audio generator 129, the noisy speech statistics generation unit 130, and the user authentication unit 132. The processor 110 and/or the voice authentication system 120 may be configured to execute software, such as a program of one or more instructions 112, stored in the memory 108. In some implementations, the processor 110 may be configured to operate in accordance with the method 500 of FIG. 5.

A wireless interface 640 may be coupled to the processor 110 and to an antenna 642. For example, the wireless interface 640 may be coupled to the antenna 642 via a transceiver 646. A coder/decoder (CODEC) 634 can also be coupled to the processor 110. According to one implementation, the voice authentication system 120 may be included in the CODEC 634. Thus, the CODEC 634 may be configured to operate in accordance with the method 500 of FIG. 5. The speaker 106 and the microphone 104 can be coupled to the CODEC 634. A display controller 626 can be coupled to the processor 110 and to a display device 628. In a particular implementation, the processor 110, the display controller 626, the memory 108, the CODEC 634, the transceiver 646, and the wireless interface 640 are included in a system-in-package or system-on-chip device 622. In a particular implementation, an input device 630 and a power supply 644 are coupled to the system-on-chip device 622. Moreover, in a particular implementation, as illustrated in FIG. 6, the display device 628, the input device 630, the speaker 106, the microphone 104, the antenna 642, and the power supply 644 are external to the system-on-chip device 622. However, each of the display device 628, the input device 630, the speaker 106, the microphone 104, the antenna 642, and the power supply 644 can be coupled to one or more components of the system-on-chip device 622, such as one or more interfaces or controllers.

In conjunction with the described techniques, an apparatus for authenticating a user based on voice recognition of a keyword includes means for generating clean speech statistics. The clean speech statistics may be generated from an audio recording of the keyword spoken by the user during an enrollment phase. For example, the means for generating the clean speech statistics may include the clean speech statistics generation unit 124 of FIGS. 1-4 and 6, one or more other devices, circuits, modules, or any combination thereof.

The apparatus may also include means for detecting the keyword from noisy input speech during an authentication phase. For example, the means for detecting may include the keyword detector 126 of FIGS. 1 and 6, the audio recording generator 122 of FIGS. 1-4 and 6, one or more other devices, circuits, modules, or any combination thereof.

The apparatus may also include means for separating speech data and noise data from the noisy input speech using the clean speech statistics. For example, the means for separating may include the separation unit 128 of FIGS. 1-4 and 6, one or more other devices, circuits, modules, or any combination thereof.

The apparatus may also include means for authenticating the user by comparing the speech data to the clean speech statistics or by comparing the noisy input speech to noisy speech statistics based at least in part on the noise data. For example, the means for authenticating may include the user authentication unit 132 of FIGS. 1-4 and 6, one or more other devices, circuits, modules, or any combination thereof.

Figure 7:
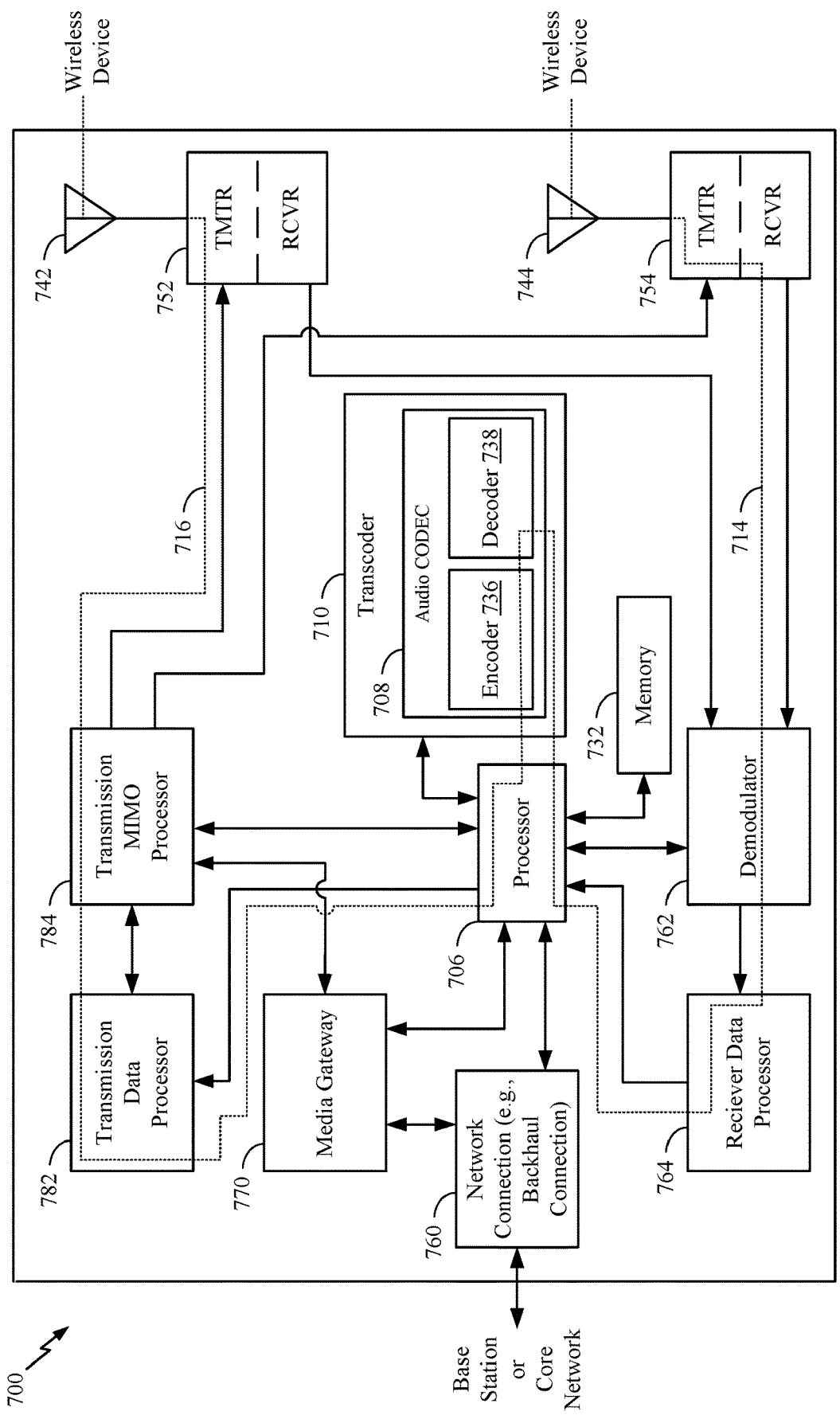
FIG. 7 is a base station that is operable to authenticate a user based on voice recognition of a keyword.

Referring to FIG. 7, a block diagram of a particular illustrative example of a base station 700 is depicted. In various implementations, the base station 700 may have more components or fewer components than illustrated in FIG. 7. In an illustrative example, the base station 700 may include the first device 104 of FIG. 1. In an illustrative example, the base station 700 may operate according to one or more of the methods or systems described with reference to FIGS. 1-5.

The base station 700 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 700 of FIG. 7.

Various functions may be performed by one or more components of the base station 700 (and/or in other components not shown), such as sending and receiving messages and data (e.g., audio data). In a particular example, the base station 700 includes a processor 706 (e.g., a CPU). The base station 700 may include a transcoder 710. The transcoder 710 may include an audio CODEC 708. For example, the transcoder 710 may include one or more components (e.g., circuitry) configured to perform operations of the audio CODEC 708. As another example, the transcoder 710 may be configured to execute one or more computer-readable instructions to perform the operations of the audio CODEC 708. Although the audio CODEC 708 is illustrated as a component of the transcoder 710, in other examples one or more components of the audio CODEC 708 may be included in the processor 706, another processing component, or a combination thereof. For example, a decoder 738 (e.g., a vocoder decoder) may be included in a receiver data processor 764. As another example, an encoder 736 (e.g., a vocoder encoder) may be included in a transmission data processor 782.

The transcoder 710 may function to transcode messages and data between two or more networks. The transcoder 710 may be configured to convert message and audio data from a first format (e.g., a digital format) to a second format. To illustrate, the decoder 738 may decode encoded signals having a first format and the encoder 736 may encode the decoded signals into encoded signals having a second format. Additionally or alternatively, the transcoder 710 may be configured to perform data rate adaptation. For example, the transcoder 710 may down-convert a data rate or up-convert the data rate without changing a format the audio data. To illustrate, the transcoder 710 may down-convert 64 kbit/s signals into 16 kbit/s signals.

The base station 700 may include a memory 732. The memory 732, such as a computer-readable storage device, may include instructions. The instructions may include one or more instructions that are executable by the processor 706, the transcoder 710, or a combination thereof, to perform one or more operations described with reference to the methods and systems of FIGS. 1-5. The base station 700 may include multiple transmitters and receivers (e.g., transceivers), such as a first transceiver 752 and a second transceiver 754, coupled to an array of antennas. The array of antennas may include a first antenna 742 and a second antenna 744. The array of antennas may be configured to wirelessly communicate with one or more wireless devices. For example, the second antenna 744 may receive a data stream 714 (e.g., a bit stream) from a wireless device. The data stream 714 may include messages, data (e.g., encoded speech data), or a combination thereof.

The base station 700 may include a network connection 760, such as backhaul connection. The network connection 760 may be configured to communicate with a core network or one or more base stations of the wireless communication network. For example, the base station 700 may receive a second data stream (e.g., messages or audio data) from a core network via the network connection 760. The base station 700 may process the second data stream to generate messages or audio data and provide the messages or the audio data to one or more wireless device via one or more antennas of the array of antennas or to another base station via the network connection 760. In a particular implementation, the network connection 760 may be a wide area network (WAN) connection, as an illustrative, non-limiting example. In some implementations, the core network may include or correspond to a Public Switched Telephone Network (PSTN), a packet backbone network, or both.

The base station 700 may include a media gateway 770 that is coupled to the network connection 760 and the processor 706. The media gateway 770 may be configured to convert between media streams of different telecommunications technologies. For example, the media gateway 770 may convert between different transmission protocols, different coding schemes, or both. To illustrate, the media gateway 770 may convert from PCM signals to Real-Time Transport Protocol (RTP) signals, as an illustrative, non-limiting example. The media gateway 770 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 770 may include a transcode and may be configured to transcode data when codecs are incompatible. For example, the media gateway 770 may transcode between an Adaptive Multi-Rate (AMR) codec and a G.711 codec, as an illustrative, non-limiting example. The media gateway 770 may include a router and a plurality of physical interfaces. In some implementations, the media gateway 770 may also include a controller (not shown). In a particular implementation, the media gateway controller may be external to the media gateway 770, external to the base station 700, or both. The media gateway controller may control and coordinate operations of multiple media gateways. The media gateway 770 may receive control signals from the media gateway controller and may function to bridge between different transmission technologies and may add service to end-user capabilities and connections.

The base station 700 may include a demodulator 762 that is coupled to the transceivers 752, 754, the receiver data processor 764, and the processor 706, and the receiver data processor 764 may be coupled to the processor 706. The demodulator 762 may be configured to demodulate modulated signals received from the transceivers 752, 754 and to provide demodulated data to the receiver data processor 764.

The receiver data processor 764 may be configured to extract a message or audio data from the demodulated data and send the message or the audio data to the processor 706.

The base station 700 may include a transmission data processor 782 and a transmission multiple input-multiple output (MIMO) processor 784. The transmission data processor 782 may be coupled to the processor 706 and the transmission MIMO processor 784. The transmission MIMO processor 784 may be coupled to the transceivers 752, 754 and the processor 706. In some implementations, the transmission MIMO processor 784 may be coupled to the media gateway 770. The transmission data processor 782 may be configured to receive the messages or the audio data from the processor 706 and to code the messages or the audio data based on a coding scheme, such as CDMA or orthogonal frequency-division multiplexing (OFDM), as an illustrative, non-limiting examples. The transmission data processor 782 may provide the coded data to the transmission MIMO processor 784.

The coded data may be multiplexed with other data, such as pilot data, using CDMA or OFDM techniques to generate multiplexed data. The multiplexed data may then be modulated (i.e., symbol mapped) by the transmission data processor 782 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 706.

The transmission MIMO processor 784 may be configured to receive the modulation symbols from the transmission data processor 782 and may further process the modulation symbols and may perform beamforming on the data. For example, the transmission MIMO processor 784 may apply beamforming weights to the modulation symbols. The beamforming weights may correspond to one or more antennas of the array of antennas from which the modulation symbols are transmitted.

During operation, the second antenna 744 of the base station 700 may receive a data stream 714. The second transceiver 754 may receive the data stream 714 from the second antenna 744 and may provide the data stream 714 to the demodulator 762. The demodulator 762 may demodulate modulated signals of the data stream 714 and provide demodulated data to the receiver data processor 764. The receiver data processor 764 may extract audio data from the demodulated data and provide the extracted audio data to the processor 706.

The processor 706 may provide the audio data to the transcoder 710 for transcoding. The decoder 738 of the transcoder 710 may decode the audio data from a first format into decoded audio data and the encoder 736 may encode the decoded audio data into a second format. In some implementations, the encoder 736 may encode the audio data using a higher data rate (e.g., up-convert) or a lower data rate (e.g., down-convert) than received from the wireless device. In other implementations, the audio data may not be transcoded. Although transcoding (e.g., decoding and encoding) is illustrated as being performed by a transcoder 710, the transcoding operations (e.g., decoding and encoding) may be performed by multiple components of the base station 700. For example, decoding may be performed by the receiver data processor 764 and encoding may be performed by the transmission data processor 782. In other implementations, the processor 706 may provide the audio data to the media gateway 770 for conversion to another transmission protocol, coding scheme, or both. The media gateway 770 may provide the converted data to another base station or core network via the network connection 760.

The transcoded audio data from the transcoder 710 may be provided to the transmission data processor 782 for coding according to a modulation scheme, such as OFDM, to generate the modulation symbols. The transmission data processor 782 may provide the modulation symbols to the transmission MIMO processor 784 for further processing and beamforming. The transmission MIMO processor 784 may apply beamforming weights and may provide the modulation symbols to one or more antennas of the array of antennas, such as the first antenna 742 via the first transceiver 752. Thus, the base station 700 may provide a transcoded data stream 716, that corresponds to the data stream 714 received from the wireless device, to another wireless device. The transcoded data stream 716 may have a different encoding format, data rate, or both, than the data stream 714. In other implementations, the transcoded data stream 716 may be provided to the network connection 760 for transmission to another base station or a core network.

The base station 700 may include a computer-readable storage device (e.g., the memory 732) storing instructions that, when executed by a processor (e.g., the processor 706 or the transcoder 710), cause the processor to perform operations including generating clean speech statistics during an enrollment phase. The clean speech statistics may be generated from an audio recording of a keyword spoken by a user during the enrollment phase. The operations may also include detecting the keyword from noisy input speech during an authentication phase. The operations may further include separating speech data and noise data from the noisy input speech using the clean speech statistics. The operations may also include authenticating the user by comparing the speech data to the clean speech statistics or by comparing the noisy input speech to noisy speech statistics based at least in part on the noise data.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (or non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
    a clean speech statistics generation unit configured to generate clean speech statistics, the clean speech statistics generated from an audio recording of a keyword separated from speech spoken by a user during an enrollment phase;
    a separation unit configured to, during an authentication phase different from the enrollment phase, separate speech data and noise data from noisy input speech;
    a noisy keyword audio generator configured to generate noisy keyword audio by combining the noise data and the audio recording of the keyword;
    a noisy speech statistics generation unit configured to generate noisy speech statistics from the noisy keyword audio; and
    a user authentication unit configured to:
        perform a first comparison of the noisy input speech to the noisy speech statistics;
        perform a second comparison of the speech data to the clean speech statistics; and
        authenticate the user based on the first comparison and the second comparison.

2. The apparatus of claim 1, wherein the separation unit is configured to filter noise from the noisy input speech using cepstral parameters of the clean speech statistics to generate the noise data.

3. The apparatus of claim 1, wherein the separation unit is configured to:
    determine a power spectrum of the keyword spoken by the user based on the clean speech statistics;
    determine components of the noisy input speech having the power spectrum to generate the speech data; and
    filter remaining components of the noisy input speech to generate the noise data.

4. The apparatus of claim 1, wherein the user authentication unit is further configured to:
    determine a first score that indicates a similarity between the speech data and the clean speech statistics; and
    compare the first score to a similarity threshold.

5. The apparatus of claim 4, wherein the user is authenticated if the first score satisfies the similarity threshold, and wherein the user is not authenticated if the first score fails to satisfy the similarity threshold.

6. The apparatus of claim 1, wherein the user authentication unit is further configured to:
    determine a second score that indicates a similarity between the noisy input speech and the noisy speech statistics; and
    compare the second score to a similarity threshold.

7. The apparatus of claim 6, wherein the user is authenticated if the second score satisfies the similarity threshold, and wherein the user is not authenticated if the second score fails to satisfy the similarity threshold.

8. The apparatus of claim 1, wherein the user authentication unit is further configured to:
    determine a first score that indicates a similarity between the speech data and the clean speech statistics;
    determine a second score that indicates a similarity between the noisy input speech and the noisy speech statistics; and
    determine whether a result of authenticating the user is reliable based on a comparison of the first score and the second score, wherein the result is determined to be reliable if the first score is similar to the second score, and wherein the result is determined to be unreliable if the first score is not similar to the second score.

9. The apparatus of claim 1, wherein the clean speech statistics generation unit, the separation unit, and the user authentication unit are integrated into a mobile device.

10. The apparatus of claim 1, wherein the user authentication unit is integrated into a base station.

11. The apparatus of claim 1, wherein the noisy keyword audio generator is further configured to generate the noisy keyword audio using the noise data and the audio recording of the keyword.

12. A method for authenticating a user based on voice recognition of a keyword, the method comprising:
    generating, at a processor, clean speech statistics, the clean speech statistics generated from an audio recording of the keyword spoken by the user during an enrollment phase;
    separating, during an authentication phase that differs from the enrollment phase, speech data and noise data from noisy input speech;
    generating noisy keyword audio by combining the noise data and the audio recording of the keyword;
    generating noisy speech statistics from the noisy keyword audio; and
    performing a first comparison of the noisy input speech to the noisy speech statistics;
    performing a second comparison of the speech data to the clean speech statistics; and
    authenticating the user based on the first comparison and the second comparison.

13. The method of claim 12, wherein separating the speech data and the noise data from the noisy input speech comprises filtering noise from the noisy input speech using cepstral parameters of the clean speech statistics to generate the noise data.

14. The method of claim 12, wherein separating the speech data and the noise data from the noisy input speech comprises:
    determining a power spectrum of the keyword spoken by the user based on the clean speech statistics;
    determining components of the noisy input speech having the power spectrum to generate the speech data; and
    filtering remaining components of the noisy input speech to generate the noise data.

15. The method of claim 12, further comprising authenticating the user by:

determining a first score that indicates a similarity between the speech data and the clean speech statistics; and comparing the first score to a similarity threshold.

16. The method of claim 15, wherein the user is authenticated if the first score satisfies the similarity threshold, and wherein the user is not authenticated if the first score fails to satisfy the similarity threshold.

17. The method of claim 12, wherein authenticating the user by comparing the noisy input speech to the noisy speech statistics comprises:

determining a second score that indicates a similarity between the noisy input speech and the noisy speech statistics; and comparing the second score to a similarity threshold.

18. The method of claim 17, wherein the user is authenticated if the second score satisfies the similarity threshold, and wherein the user is not authenticated if the second score fails to satisfy the similarity threshold.

19. The method of claim 12, further comprising:

determining a first score that indicates a similarity between the speech data and the clean speech statistics;

determining a second score that indicates a similarity between the noisy input speech and the noisy speech statistics; and determining whether a result of authenticating the user is reliable based on a comparison of the first score and the second score, wherein the result is determined to be reliable if the first score is similar to the second score, and wherein the result is determined to be unreliable if the first score is not similar to the second score.

20. The method of claim 12, wherein generating the clean speech statistics, detecting the keyword, separating the speech data and the noise data, and authenticating the user are performed at a mobile device.

21. The method of claim 12, wherein authenticating the user is performed at a base station.

22. The method of claim 12, wherein the authentication phase occurs after the enrollment phase.

23. The method of claim 12, wherein the combining of the noise data, the audio recording of the keyword, and the authenticating the user are performed within a device that comprises a mobile communication device.

24. A non-transitory computer-readable medium comprising instructions for authenticating a user based on voice recognition of a keyword, the instructions, when executed by a processor, cause the processor to perform operations comprising:

generating clean speech statistics, the clean speech statistics generated from an audio recording of the keyword spoken by the user during an enrollment phase;

separating, during an authentication phase that differs from the enrollment phase, speech data and noise data from noisy input speech;

generating noisy keyword audio by combining the noise data and the audio recording of the keyword;

generating noisy speech statistics from the noisy keyword audio; and performing a first comparison of the noisy input speech to the noisy speech statistics;

performing a second comparison of the speech data to the clean speech statistics; and authenticating the user based on the first comparison and the second comparison.

25. The non-transitory computer-readable medium of claim 24, wherein separating the speech data and the noise data from the noisy input speech comprises filtering noise from the noisy input speech using cepstral parameters of the clean speech statistics to generate the noise data.

26. The non-transitory computer-readable medium of claim 24, wherein separating the speech data and the noise data from the noisy input speech comprises:

determining a power spectrum of the keyword spoken by the user based on the clean speech statistics;

determining components of the noisy input speech having the power spectrum to generate the speech data; and filtering remaining components of the noisy input speech to generate the noise data.

27. The non-transitory computer-readable medium of claim 24, wherein the operations further comprise:

determining a first score that indicates a similarity between the speech data and the clean speech statistics; and comparing the first score to a similarity threshold.

28. An apparatus comprising:

means for generating clean speech statistics, the clean speech statistics generated from an audio recording of a keyword spoken by a user during an enrollment phase;

means for separating, during an authentication phase that differs from the enrollment phase, speech data and noise data from noisy input speech;

means for generating noisy keyword audio by combining the noise data and the audio recording of the keyword;

means for generating noisy speech statistics from the noisy keyword audio; and means for authenticating the user by:

performing a first comparison of the noisy input speech to the noisy speech statistics;

performing a second comparison of the speech data to the clean speech statistics; and authenticating the user based on the first comparison and the second comparison.

29. The apparatus of claim 28, wherein the means for generating the clean speech statistics, the means for separating the speech data and the noise data, and the means for authenticating the user are integrated into a mobile device.

30. The apparatus of claim 28, wherein the means for authenticating the user is integrated into a base station.

* * * * *